(12) United States Patent
Lee et al.

(10) Patent No.: US 11,402,670 B2
(45) Date of Patent: Aug. 2, 2022

(54) LIGHT MODULATOR, BEAM STEERING DEVICE INCLUDING THE LIGHT MODULATOR, AND ELECTRONIC DEVICE INCLUDING THE BEAM STEERING DEVICE

(71) Applicant: SAMSUNG ELECTRONICS CO., LTD., Suwon-si (KR)

(72) Inventors: Duhyun Lee, Yongin-si (KR); Changgyun Shin, Anyang-si (KR); Sunil Kim, Hwaseong-si (KR); Junghyun Park, Seoul (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 16/805,070

(22) Filed: Feb. 28, 2020

(65) Prior Publication Data

US 2021/0088813 A1 Mar. 25, 2021

(30) Foreign Application Priority Data

Sep. 23, 2019 (KR) .................. 10-2019-0116875

(51) Int. Cl.
*G02F 1/017* (2006.01)
*G02F 1/01* (2006.01)
(Continued)

(52) U.S. Cl.
CPC ............ *G02F 1/017* (2013.01); *G02F 1/0102* (2013.01); *G02F 1/19* (2013.01); *B82Y 20/00* (2013.01);
(Continued)

(58) Field of Classification Search
CPC ......... G02F 2202/108; G02F 2201/346; G02F 1/0791; G02F 1/19; G02F 1/0102; G02F 1/017
See application file for complete search history.

(56) References Cited

U.S. PATENT DOCUMENTS 6,556,610 B1 * 4/2003 Jiang .................. H01S 5/18369
372/50.1
8,615,028 B1 12/2013 Sayyah et al.
(Continued)

FOREIGN PATENT DOCUMENTS

EP 3 171 204 A1 5/2017

OTHER PUBLICATIONS

Wu, Pin Chieh et al., "Dynamic beam steering with all-dielectric electro-optic III-V multiple-quantum-well metasurfaces", Nature Communications, Jan. 1, 2019, vol. 10, No. 1, XP55725908. (9 pages total).
(Continued)

*Primary Examiner* — Christopher Stanford
*Assistant Examiner* — Journey F Sumlar
(74) *Attorney, Agent, or Firm* — Sughrue Mion, PLLC

(57) ABSTRACT

A light modulator for amplifying an intensity of incident light and modulating a phase of the incident light is provided. The light modulator includes: a first distributed Bragg reflector (DBR) layer having a first reflectivity and comprising at least two first refractive index layers that have different refractive indices from each other and are repeatedly alternately stacked; a second DBR layer having a second reflectivity and comprising at least two second refractive index layers that have different refractive indices from each other and are repeatedly alternately stacked; and an active layer disposed between the first DBR layer and the second DBR layer, and comprising a quantum well structure.

19 Claims, 12 Drawing Sheets

(51) Int. Cl.
*G02F 1/19* (2019.01)
*G02F 1/015* (2006.01)
*B82Y 20/00* (2011.01)

(52) U.S. Cl.
CPC ........ *G02F 1/0151* (2021.01); *G02F 1/01791* (2021.01); *G02F 2201/346* (2013.01); *G02F 2202/108* (2013.01)

(56) References Cited

U.S. PATENT DOCUMENTS

| | | | |
|---|---|---|---|
| 10,126,411 | B2 | 11/2018 | Gilliland et al. |
| 10,141,718 | B2 | 11/2018 | Garnache-Creuillot et al. |
| 2002/0176474 | A1* | 11/2002 | Huang .................. B82Y 20/00 |
| | | | 372/96 |
| 2003/0006429 | A1* | 1/2003 | Takahashi ........... H01S 5/18311 |
| | | | 257/200 |
| 2007/0291808 | A1* | 12/2007 | Ledentsov ............ H01S 5/0601 |
| | | | 257/E27.12 |
| 2008/0298416 | A1* | 12/2008 | Chirovsky .......... H01S 5/18369 |
| | | | 372/50.124 |
| 2010/0027104 | A1 | 2/2010 | Esener et al. |
| 2013/0175500 | A1* | 7/2013 | Cho ................ H01L 31/035236 |
| | | | 257/21 |
| 2014/0182667 | A1* | 7/2014 | Richards ............. H01L 31/0725 |
| | | | 438/69 |
| 2018/0196138 | A1 | 7/2018 | Lee et al. |

OTHER PUBLICATIONS

Communication dated Sep. 9, 2020 by the European Patent Office in counterpart European Patent Application No. 20170875.7.
Manuel Decker et al. "High-Efficiency Dielectric Huygens' Surfaces" Advanced Optical Materials, vol. 3, 2015, (pp. 813-820).
Daniel Töyrä "Impedance Matched GW optics" 2009, (7 pages total).
Hui-Hsin Hsiao et al. "Integrated Resonant Unit of Metasurfaces for Broadband Efficiency and Phase Manipulation" Advanced Optical Materials, vol. 6, 2018 (10 pages).

* cited by examiner

LIGHT MODULATOR, BEAM STEERING DEVICE INCLUDING THE LIGHT MODULATOR, AND ELECTRONIC DEVICE INCLUDING THE BEAM STEERING DEVICE

CROSS-REFERENCE TO RELATED APPLICATION

This application claims priority from Korean Patent Application No. 10-2019-0116875, filed on Sep. 23, 2019, in the Korean Intellectual Property Office, the disclosure of which is incorporated herein by reference in its entirety.

BACKGROUND

1. Field

Apparatuses and methods consistent with example embodiments relate to a light modulator, a beam steering device including the light modulator, and an electronic device including the beam steering device.

2. Description of Related Art

A light modulator for modulating transmittance/reflection, polarization, a phase, an intensity, a path, etc. of incident light is used for various optical devices. Also, light modulators of various structures have been implemented for controlling the characteristics of light, as required by an optical device.

For example, a liquid crystal structure having optical anisotropy, a micro-electromechanical system (MEMS) using micro-mechanical motion of light prevention/reflection elements, etc. are widely used in general light modulators. These light modulators have an operational response speed of at least several μs based on their operative characteristics. Also, in an optical phased array (OPA) method, a phase of light is modulated by using interference of various pixels or a bunch of optical rays in the form of waveguides.

When the structure of the MEMS using the mechanical motion is used, a volume of a light modulator may be increased to cause an increased expense. In addition, the application of the MEMS may be limited due to issues including vibration, etc.

According to the controlling technique of the OPA method, each pixel or waveguide has to have a driving pixel and a pixel operator has to have an operating driver, and thus, circuits and devices may inevitably become complex and process costs may be increased.

Recently, there has been an attempt to apply a metasurface to a light modulator. The metasurface is a structure in which a value less than a wavelength of incident light is applied to a thickness, a pattern, a cycle, etc. For example, optical devices having variable optical characteristics (e.g., a refractive index) and using a tunable metasurface based on a semiconductor material having a multi-quantum well structure are used in various technical fields from optical communication to optical sensing.

For example, a light modulator using a tunable metasurface may include a Fabry-Perot resonator structure formed as a sandwich structure in which a semiconductor material layer is provided between a pair of distributed Bragg reflectors (hereinafter, referred to as DBR).

The light modulator for modulating light by using the Fabry-Perot resonator structure including a pair of DBRs and a semiconductor material layer may include an optical material having losses. Generally, a great resonance structure is used for high phase modulation. However, in this case, optical losses may also be increased to decrease the efficiency of a light modulator.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide a light modulator having a saturation gain due to an active layer including a quantum dot.

Further, one or more example embodiments provide a beam steering device including a light modulator having a saturation gain and an electronic device including the beam steering device.

According to an aspect of an example embodiment, there is provided a light modulator for amplifying an intensity of incident light and modulating a phase of the incident light, including: a first distributed Bragg reflector (DBR) layer having a first reflectivity and comprising at least two first refractive index layers that have different refractive indices from each other and are repeatedly alternately stacked; a second DBR layer having a second reflectivity and comprising at least two second refractive index layers that have different refractive indices from each other and are repeatedly alternately stacked; and an active layer disposed between the first DBR layer and the second DBR layer, and comprising a quantum well structure.

The quantum well structure may include at least one quantum dot that has a single gain satisfying $Gs^2*Rf*Rb<1$, and Gs, Rf, and Rb denote the single gain, the second reflectivity, and the first reflectivity.

The quantum well structure may include at least one quantum dot that has a single gain satisfying $Gs^2>1/Rb$, and Gs, Rf, and Rb denote the single gale, the second reflectivity, and the first reflectivity.

The quantum well structure may include a well layer and a barrier layer, and the well layer may include a plurality of quantum dots.

The active layer may include a plurality of stack structures, and each of the plurality of stack structures may include a well layer and a barrier layer that are alternately stacked.

The active layer may include a first multi-stack structure having a first plurality of stack structures and a second multi-stack structure having a second plurality of stack structures.

The light modulator may further include a barrier layer between the first multi-stack structure and the second multi-stack structure.

The quantum well structure of the active layer may include a first multi-stack structure and a second multi-stack structure, wherein each of the first multi-stack structure and the second multi-stack structure may include a well layer and a first barrier layer which are alternatively stacked, wherein the light modulator further may include a second barrier layer disposed between the first multi-stack structure and the second multi-stack structure, and wherein a thickness of the second barrier layer may be greater than a thickness of the first barrier layer.

The quantum well structure of the active layer may include at least one quantum dot, and a band gap energy of the at least one quantum dot may be equal to an energy of the incident light.

The active layer may have a saturation gain at an applied current having a value greater than or equal to a predetermined value.

The first reflectivity may be greater than the second reflectivity.

The light modulator may further include a processor configured to separately modulate a refractive index and a gain of the active layer by applying a current between the first DBR layer and the second DBR layer.

The light modulator may further include a plurality of meta structures disposed on the second DBR layer.

At least two of the plurality of meta structures may have different refractive indices from each other.

The light modulator may further include a first contact layer disposed on the first DBR layer and a second contact layer disposed on the second DBR layer.

According to an aspect of another example embodiment, there is provided a beam steering device including: a light modulator array including a plurality of light modulators including the light modulator, the plurality of light modulators having a same structure; and a control circuit configured to separately control refractive indices of the plurality of light modulators.

The plurality of light modulators may have a same quantum dot distribution density.

The control circuit may include a plurality of complementary metal-oxide-semiconductor (CMOS) devices each being connected to two adjacent light modulators of the plurality of light modulators.

According to an aspect of another example embodiment, there is provided an electronic device including: a light source; the beam steering configured to modulate a proceeding direction of the light incident from the light source toward an object; a sensor configured to receive the light that is reflected from the object; and a processor configured to analyze the light received by the sensor.

The at least one quantum dot may have a single gain satisfying $1/Rb < Gs^2 < 1/(Rf*Rb)$, and Gs, Rb, and Rf denote the single gain, the first reflectivity, and the second reflectivity.

According to an aspect of another example embodiment, there is provided an optical sensor including a light modulator including: a first distributed Bragg reflector (DBR) layer; a second DBR layer; and a quantum well disposed between the first DBR layer and the second DBR layer, wherein the optical sensor may be configured to apply a current between the first DBR layer and the second DBR layer to control a gain of the phase modulator and a phase of the incident light through an interband transition of electrons between a valence band and a conduction band of the quantum well.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
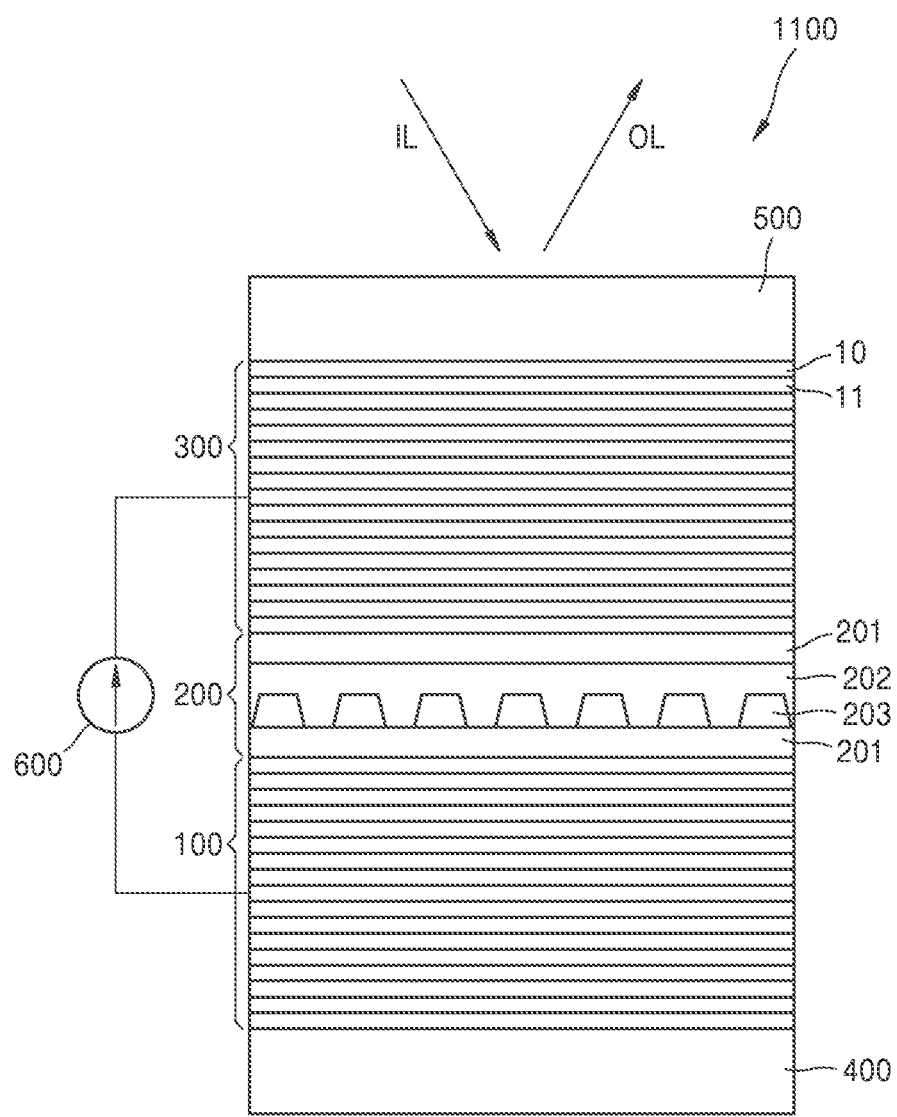
FIG. 1 is a lateral cross-sectional view schematically showing a structure of a light modulator according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, light modulators, beam steering devices including the light modulators, and electronic devices including the beam steering devices according to various embodiments will be described with reference to the accompanying drawings. In the drawings, like reference numerals refer to like elements, and sizes or thicknesses of components may be exaggerated for clarity of explanation.

The terms first, second, etc. may be used to describe various components. However, the components are not limited by the terms. The terms are used for only the purpose of distinguishing one component from another. A light modulator device, a beam steering device including the light modulator device, and an electronic device including the beam steering device may be realized in various forms, and are not limited to the embodiments described herein.

Throughout the specification, it will be further understood that when a part "includes" or "comprises" an element, unless otherwise defined, the part may further include other elements, not excluding the other elements.

Figure 2:
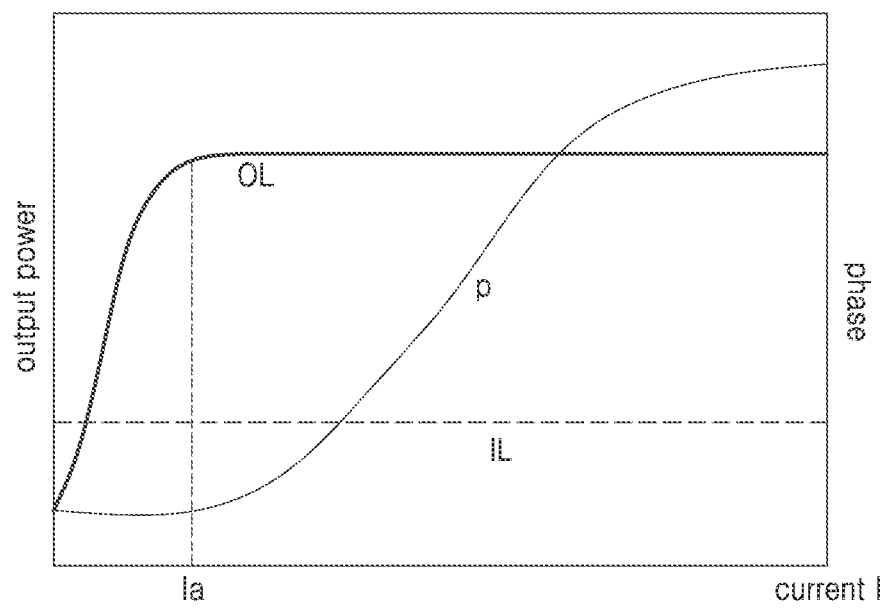
FIG. 2 is a graph showing characteristics of the light modulator of FIG. 1.

FIG. 1 is a lateral cross-sectional view schematically showing a structure of a light modulator 1100 according to an embodiment. FIG. 2 is a graph showing characteristics of the light modulator 1100 of FIG. 1.

Referring to FIG. 1, the light modulator 1100 may include a first distributed Bragg reflector (DBR) layer 100 having a first reflectivity Rb, an active layer 200, and a second DBR layer 300 having a second reflectivity Rf. The first DBR layer 100 may include two refractive index layers that have different refractive indices from each other and are repeatedly alternately stacked. The active layer 200 is provided on the first DBR layer 100 and includes a quantum well structure having a stack structure in which a well layer 202 and a first barrier layer 201 are alternately stacked. At least one quantum dot 203 is provided in the well layer 202. The second DBR layer 300 is provided on the active layer 200 and includes two refractive index layers that have different refractive indices from each other and are repeatedly alternately stacked. Also, a first contact layer 400 may be provided on the first DBR layer 100 and a second contact layer 500 may be provided on the second DBR layer 300. For example, the first contact layer 400 may be provided on the lower surface of the first DBR layer 100 and the second contact layer 500 may be provided on the upper surface of the second DBR layer 300.

The light modulator 1100 may amplify an intensity of incident light IL. Accordingly, output light OL may have a greater intensity than the incident light IL. Also, the light modulator 1100 may modulate a phase of the incident light IL. Accordingly, a proceeding direction of the output light OL may be regulated such that the output light OL proceeds in a direction as desired, regardless of an incident angle of the incident light IL. The functions of amplifying the incident light IL and modulating the phase of the incident light IL of the light modulator 1100 are described later with reference to the drawing.

The first DBR layer 100 and the second DBR layer 300 may form a Fabry-Perot resonator. The incident light IL incident into the second DBR layer 300 from the outside may resonate between the first DBR layer 100 and the second DBR layer 300. Here, the first reflectivity Rb of the first DBR layer 100 may be greater than the second reflectivity Rf of the second DBR layer 300. Accordingly, the light resonating between the first DBR layer 100 and the second DBR layer 300 may be output to the outside through the second DBR layer 300. Also, since the first reflectivity Rb of the first DBR layer 100 is greater than the second reflectivity Rf of the second DBR layer 300, a phase change of the incident light IL may occur within a range of 360 degrees.

The first DBR layer 100 and the second DBR layer 300 may function as a mirror having a high reflectivity and may include a pair of material layers having different refractive indices from each other. For example, the first DBR layer 100 and the second DBR layer 300 may include structures in which a low refractive index layer 10 having a relatively low refractive index and a high refractive index layer 11 having a relatively high refractive index are alternately stacked. For example, the first DBR layer 100 and the second DBR layer 300 may include a structure of AlAs/$Al_{0.5}Ga_{0.5}As$ or a structure of $Al_{0.9}Ga_{0.1}As/Al_{0.3}Ga_{0.7}As$ repeatedly alternately stacked. However, it is not limited thereto and the ratio of Al to Ga may be changed. Also, the low refractive index layer 10 and the high refractive index layer 11 of the first and second DBR layers 100 and 300 may include materials totally different from the described materials. When light of a specific wavelength is incident into the first and second DBR layers 100 and 300 having this structure, reflection may occur at a boundary surface of the low refractive index layer 10 and the high refractive index layer 11. Here, the high reflectivity may be obtained by removing or reducing phase differences between all the lights so that the lights have the same phase and constructive interference of reflected lights may occur. To this end, an optical thickness (a value obtained by multiplying a physical thickness of a layer by a refractive index of the layer) of each of the low refractive index layer 10 and the high refractive index layer 11 may correspond to a value of an odd multiple of $\lambda/4$ ($\lambda$ is a wavelength of incident light). The first and second DBR layers 100 and 300 may have an increased reflectivity as the number of times the pair of the low refractive index layer 10 and the high refractive index layer 11 are repeatedly stacked is increased. For example, the number of times the pair of low refractive index layer 10 and the high refractive index layer 11 are repeatedly stacked may be greater in the case of the first DBR layer 100 than in the case of the second DBR layer 300. Accordingly, the reflectivity Rb of the first DBR layer 100 may be greater than the reflectivity Rf of the second DBR layer 300.

The active layer 200 may include a semiconductor material having a quantum well structure. For example, the active layer 200 may include a stack structure in which the well layer 202 and the first barrier layer 201 are alternately stacked. The active layer 200 may include a plurality of first barrier layers 201 and a plurality of well layers 202 which are alternately stacked, or a pair of first barrier layers 201 and one well layer 202 disposed between the pair of first barrier layers 201. A band gap energy of the first barrier layer 201 may be greater than a band gap energy of the well layer 202. The well layer 202 has a relatively less band gap energy than the first barrier layer 201 contacting the well layer 202, and thus, an electron and a hole may have an quantized energy level in the well layer 202. For example, the first barrier layer 201 may include GaAs and the well layer 202 may include InGaAs. However, it is not limited thereto, and the first barrier layer 201 and the well layer 202 may include other materials than the described materials. Also, when a current source 600 applies a current between the first DBR layer and the second DBR layer so that the current flows into the active layer 200, a refractive index of the active layer 200 may be changed. Accordingly, a phase of the incident light IL and a phase of the output light OL may be different from each other. That is, as the refractive index of the active layer 200 is changed, a proceeding direction of light having passed through the light modulator 1100 may be changed.

The active layer 200 may further include a quantum dot. For example, the at least one quantum dot 203 may be provided in the well layer 202. However, it is not limited thereto and a plurality of quantum dots 203 may be provided in the well layer 202. A band gap energy of the quantum dot 203 may be less than a band gap energy of the well layer 202. The band gap energy of the quantum dot 203 may be the same as an energy of the incident light IL. For example, the quantum dot 203 may include InAs. However, it is not limited thereto and the quantum dot 203 may include other materials than the described material.

In the quantum dot 203, density inversion may occur due to a current applied, as described below. When the incident light having a specific energy is incident into the quantum dot 203 in which density inversion occurs, stimulated emission may occur. The intensity of the incident light IL may be amplified due to the stimulated emission. The occurrence of stimulated emission may be increased as the applied current is increased. Accordingly, an amplification rate of the intensity of the incident light IL may be increased. However, stimulated emission may not be increased any more when the current reaches a value equal to or greater than a specific value, and thus, the amplification rate of the intensity of the incident light IL may be saturated. The principle of the saturation of the amplification rate of the intensity of the incident light IL will be described below with reference to FIG. 2. Like this, when the amplification rate of the intensity of the incident light IL is saturated, it may be referred to as a case that the active layer 200 has a saturation gain. The saturation gain of the active layer 200 may be determined based on a distribution density of the quantum dot 203 having a single gain Gs. For example, as the distribution density of the quantum dot 203 is increased, the saturation gain of the active layer 200 may be increased.

The single gain Gs of the quantum dot 203 may satisfy $Gs^2 * Rf * Rb < 1$. When the single gain Gs is increased such that the value of $Gs^2 * Rf * Rb$ is equal to or greater than 1, spontaneous emission may occur in the quantum dot 203. That is, when the single gain Gs of the quantum dot 203 is increased to a value beyond a predetermined threshold, lasing may occur even when a little current flows in the light modulator 1100. In this case, even when light is not incident into the light modulator 1100, light may be emitted from the light modulator 1100. Accordingly, the light modulator 1100 may not be used for a beam steering device for modulating the phase of the incident light IL.

Also, the single gain Gs of the quantum dot 203 may satisfy $Gs^2 > 1/Rb$. When the single gain Gs is decreased such that the value of $Gs^2$ is equal to or less than $1/Rb$, the active layer 200 may have a loss. Thus, it is desired to design the single gain Gs of the quantum dot 203 to satisfy $Gs^2 > 1/Rb$ so that the active layer 200 has a gain.

Like this, when the single gain Gs of the quantum dot 203 satisfies $1/Rb < Gs^2 < 1/(Rf * Rb)$, lasing due to spontaneous emission may not occur in the quantum dot 203 and at the same time, the active layer 200 may have a gain.

The first contact layer 400 may include an N-type contact layer doped with an N-type material and the second contact layer 500 may include a P-type contact layer doped with a P-type material. FIG. 1 illustrates that the first contact layer 400 is provided below the first DBR layer 100. However, it is not limited thereto. For example, the first contact layer 400 may be provided between the active layer 200 and the first DBR layer 100. Also, FIG. 1 illustrates that the second contact layer 500 is provided above the second DBR layer 300. However, it is not limited thereto. For example, the second contact layer 500 may be provided between the active layer 200 and the second DBR layer 300. An electrode may further be provided on the first contact layer 400 and the second contact layer 500.

Referring to FIG. 2, the intensity of the output light OL output from the light modulator 1100 may be increased as a current I applied to the active layer 200 is increased. However, the intensity of the output light OL may not be increased any more when the current reaches a value equal to or greater than a specific value Ia. Accordingly, the active layer 200 may have a saturation gain at an applied current having a value equal to or greater than the specific value Ia be because among electrons being capable of being directly engaged in causing stimulated emission in the active layer 200, only a limited number of electrons may flow into a ground state of a conduction band of the quantum dot 203. On the contrary, even in a region in which the gain of the active layer 200 is not increased any more, a refractive index of the active layer 200 may be changed. In other words, even in a region in which the intensity of the output light OL is not increased any more, a phase p of the incident light IL may be changed.

As described above, the light modulator 1100 may continually change the phase of the incident light IL while having the saturation gain based on an applied current. Like this, the light modulator 1100 may further include a processor configured to separately control the gain and the refractive index. For example, the processor may separately regulate the refractive index and the gain of the active layer 200 by applying a current between the first DBR layer 100 and the second DBR layer 300. Accordingly, the light modulator 1100 may efficiently control a proceeding direction of the incident light IL. The principle of separately controlling via the light modulator 1100 the gain and the refractive index will be described below with reference to FIG. 5.

Figure 3:
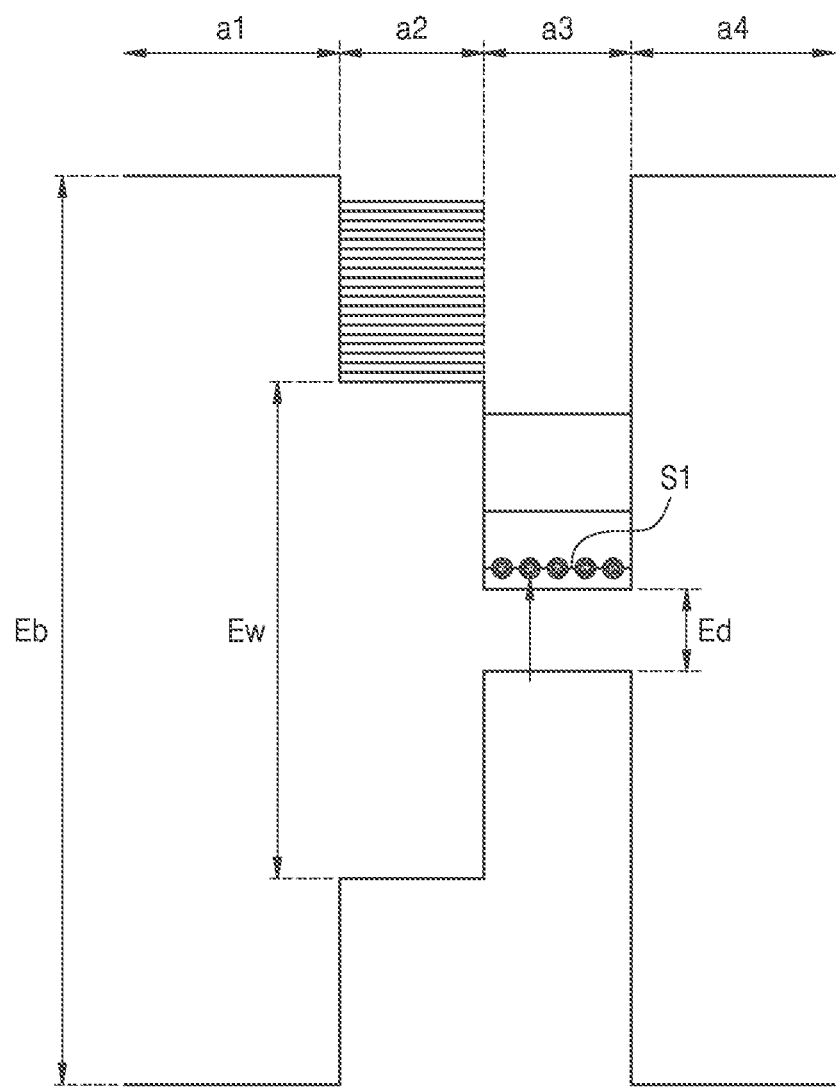
FIG. 3 schematically shows a process in which density inversion occurs in the light modulator of FIG. 1.
Figure 4:
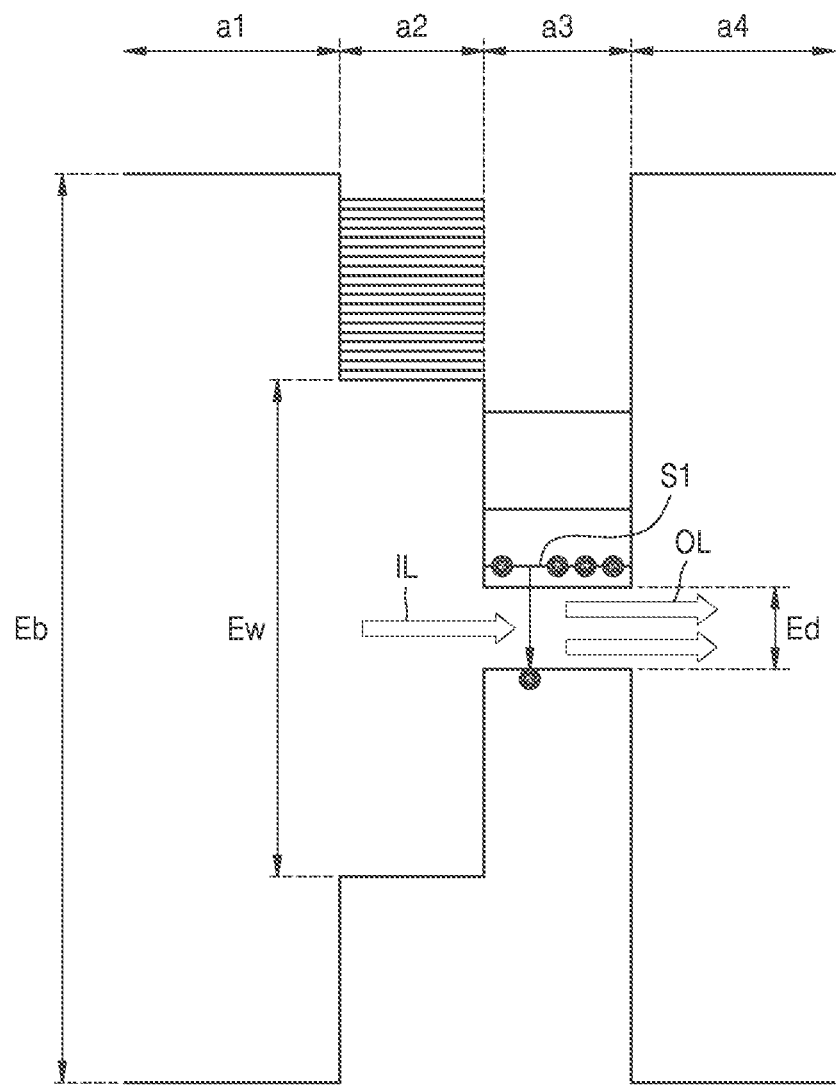
FIG. 4 schematically shows a process in which stimulated emission occurs in the light modulator of FIG. 1.
Figure 5:
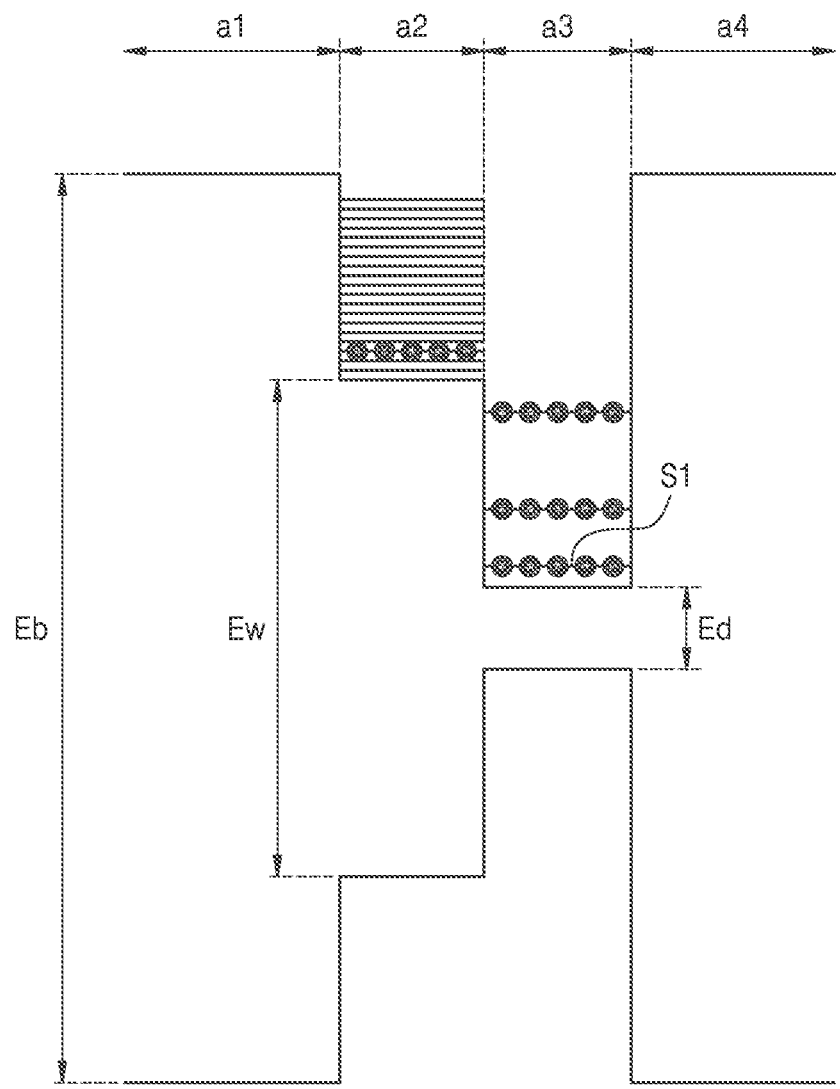
FIG. 5 schematically shows a process in which a refractive index is changed in the light modulator of FIG. 1.

FIG. 3 schematically shows a process in which density inversion occurs in the light modulator 1100 of FIG. 1. FIG. 4 schematically shows a process in which stimulated emission occurs in the light modulator 1100 of FIG. 1. FIG. 5 schematically shows a process in which a refractive index is changed in the light modulator 1100. In the descriptions of FIGS. 3 through 5, the components illustrated in FIG. 1 will be referred to. As illustrated in FIGS. 3 through 5, a band gap energy Eb of a first barrier layer a1 or a4 may be greater than a band gap energy Ew of a well layer a2. Also, the band gap energy Ew of the well layer a2 may be greater than a band gap energy Ed of the quantum dot 203.

Referring to FIG. 3, when an electron staying in a valence band of the quantum dot 203 gains energy and moves to a conduction band due to the current applied between the first and second DBR layers 100 and 300, density inversion may occur. For example, the electron staying in the valence band of the quantum dot 203 may gain energy and may be filled in a ground state S1 of the conduction band. For example, when a current corresponding to the band gap energy Ed of the quantum dot 203 is applied between the first and second DBR layers 100 and 300, electrons in the valence band of the quantum dot 203 may gain energy and move to the conduction band, and thus, density inversion may occur. When currents are continually applied, more electrons may move, and thus, the occurrence of density inversion may be increased.

Referring to FIG. 4, the incident light IL may have a wavelength having an energy equal to the band gap energy Ed of the quantum dot 203, and density inversion may occur in the quantum dot 203. When the incident light IL is incident into the light modulator 1100, stimulated emission may occur, and thus, the intensity of the incident light IL may be amplified. Thus, the output light OL having a greater intensity than the incident light IL may be output from the light modulator 1100. Meanwhile, stimulated emission may occur by the electrons filled in the ground state S1 of the conduction band of the quantum dot 203. As described above, the number of the electrons filled in the ground state S1 is limited, and thus, even when currents are continually applied between the first and second DBR layers 100 and 300, the occurrence of stimulated emission may not be increased any more. Accordingly, the amplification rate of the incident light IL may not be increased any more when the amplification rate reaches a value equal to or greater than a specific value, and may be saturated. In other words, the active layer 200 may have a saturation gain when a current having a value greater than or equal to a specific value is applied.

Referring to FIG. 5, while the magnitude of the current between the first DBR layer 100 and the second DBR layer 300 is increased, electrons may be filled in a plurality of quantized states of a quantum dot a3 and the well layer a2.

As described above, the gain of the active layer 200 may be determined by the electrons in the ground state S1 of the conduction band of the quantum dot 203. Separately, the refractive index of the active layer 200 may be determined by the electrons filled in the plurality of states of the well layer a2. For example, even after electrons are completely filled in the plurality of states including the ground state S1 of the quantum dot 203, when currents are continually applied to the active layer 200, electrons may be continually filled in the plurality of states of the well layer a2. As the number of the electrons filled in the well layer a2 is changed, the refractive index of the active layer 200 may be changed. As described above, the gain of the active layer 200 may not be increased any more and may be saturated, when the current having the value equal to or greater than a specific value is applied, even when applied currents are increased. On the contrary, even when the gain of the active layer 200 is saturated, the refractive index of the active layer 200 may be continually changed, when the currents are continually applied to the active layer 200. Like this, by applying the current to the active layer 200, the gain and the refractive index may be separately controlled.

The light modulator 1110 may include a current source 600 that applies a current between the first DBR layer 100 and the second DBR layer 300 to control a gain of the light modulator 1110 and a phase of the incident light through an interband transition of electrons between the valence band and the conduction band of the well layer 202.

Figure 6:
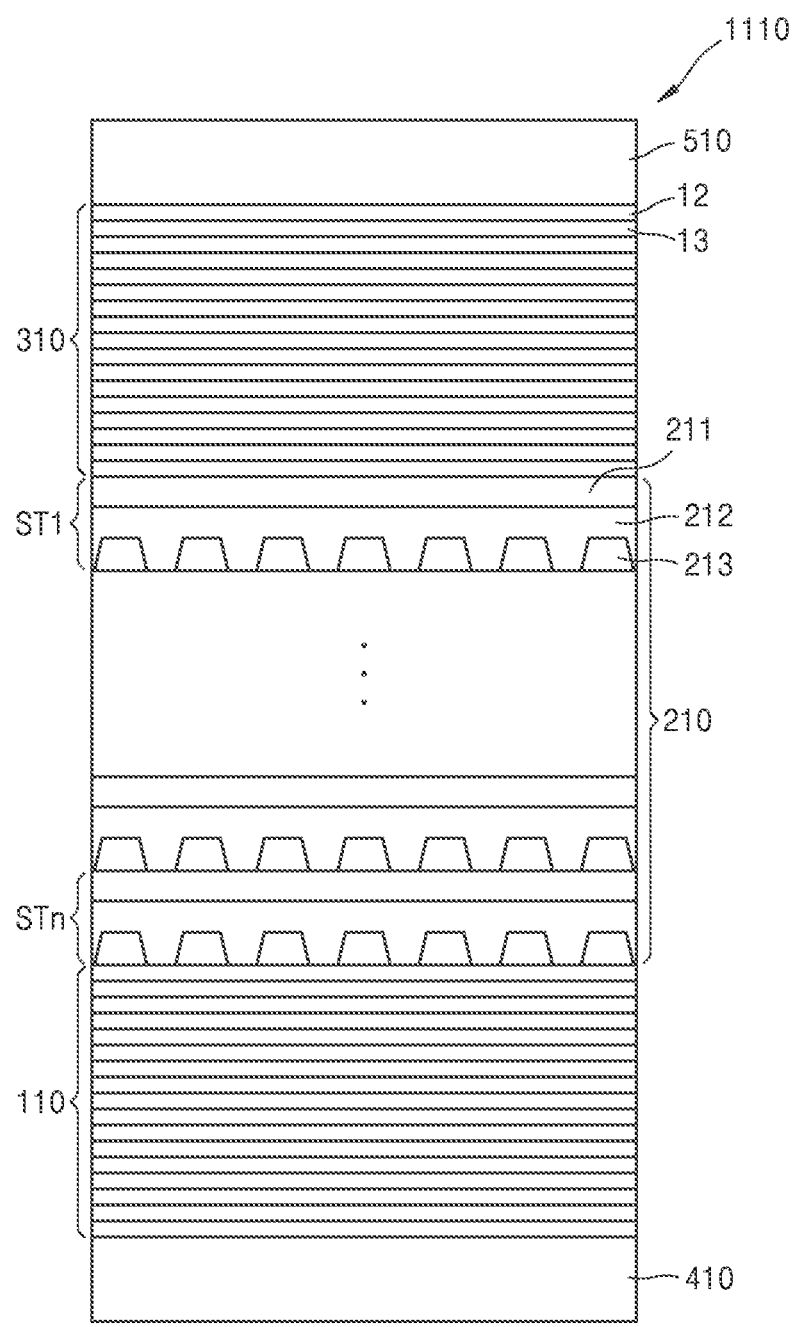
FIG. 6 is a lateral cross-sectional view schematically showing a structure of a light modulator according to another embodiment.

FIG. 6 is a lateral cross-sectional schematically showing a structure of a light modulator 1110 according to another embodiment. When describing the embodiment of FIG. 6, aspects that are the same as the aspects of the embodiment of FIG. 1 are omitted.

Referring to FIG. 6, the light modulator 1110 may include a first DBR layer 110 of a first reflectivity Rb, a second DBR layer 310 of a second reflectivity Rf, and an active layer 210 disposed between the first DBR layer 110 and the second DBR layer 310. The first DBR layer 100 may include two refractive index layers that have different refractive indices from each other and are repeatedly alternately stacked. The active layer 210 may be provided on the first DBR layer 110 and may include a quantum well structure having a stack structure in which a well layer 212 and a first barrier layer 211 are alternately stacked. At least one quantum dot 213 is provided in the well layer 212. The second DBR layer 310 may be provided on the active layer 210, and may include two refractive index layers having different refractive indices from each other are repeatedly alternately stacked. Also, the light modulator 1110 may further include a first contact layer 410 provided below the first DBR layer 110 and a second contact layer 510 provided above the second DBR layer 310. However, it is not limited thereto and the first contact layer 410 may be provided between the active layer 210 and the first DBR layer 110. Also, the second contact layer 510 may be provided between the active layer 210 and the second DBR layer 310.

The first DBR layer 110 and the second DBR layer 310 may have substantially the same structures as the first DBR layer 100 and the second DBR layer 300 of FIG. 1, respectively. For example, the first DBR layer 110 and the second DBR layer 310 may include structures in which a low refractive index layer 12 having a relatively low refractive index and a high refractive index layer 13 having a relatively high refractive index are alternately stacked.

The first contact layer 410 and the second contact layer 510 may have substantially the same structures as the first contact layer 400 and the second contact layer 500 of FIG. 1, respectively.

The active layer 210 may include a semiconductor material having a quantum well structure. For example, the active layer 210 may include a plurality of stack structures ST1 through STn (n is a natural number) in which the well layer 212 and the first barrier layer 211 are alternately stacked. As the number of the plurality of stack structures ST1 through STn is increased, a gain of the active layer 210 may be increased.

Each of the plurality of stack structures ST1 through STn may include at least one quantum dot 213. The quantum dot 213 may have substantially the same structure as the quantum dot 203 of FIG. 2.

Figure 7:
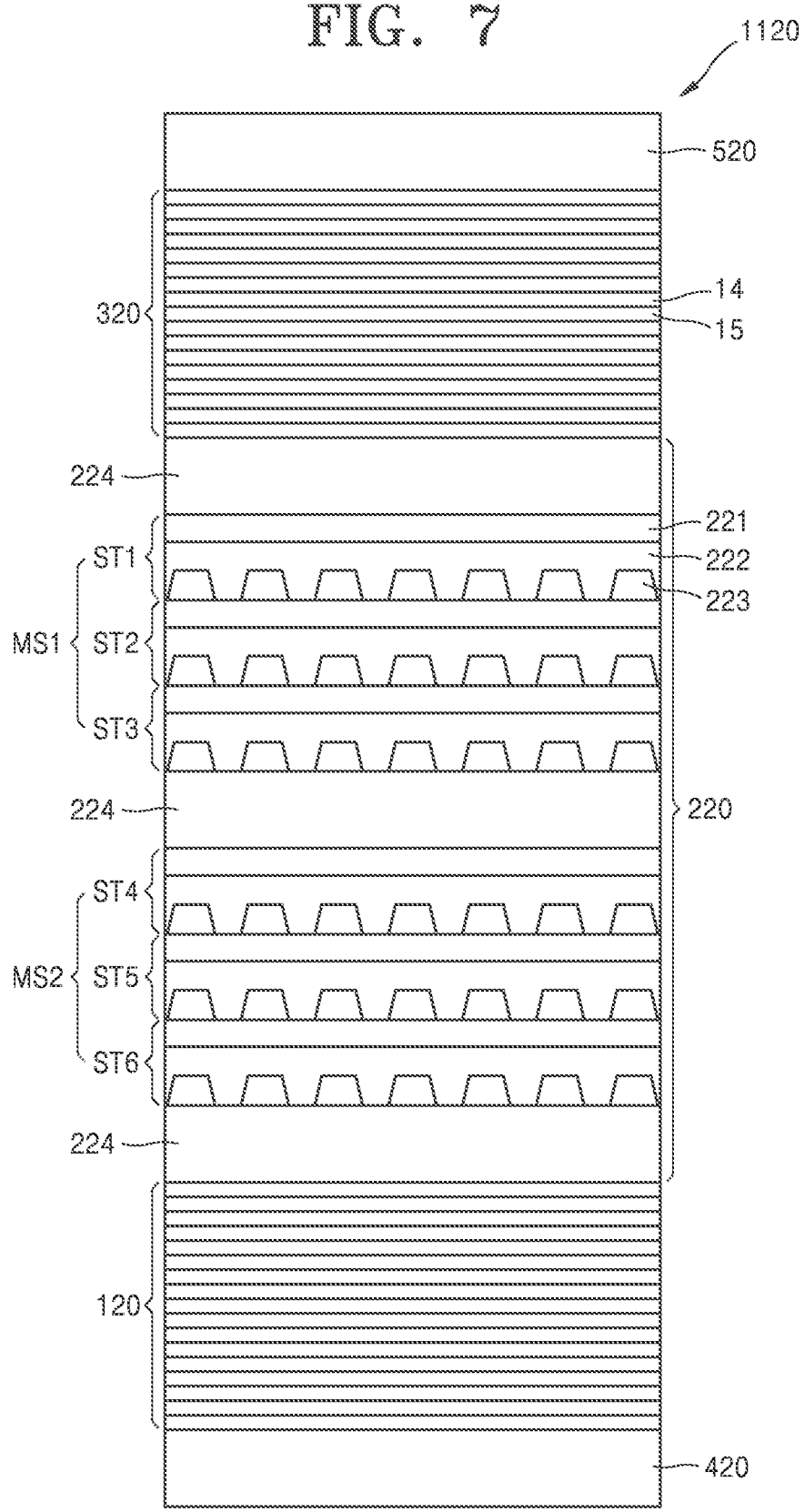
FIG. 7 is a lateral cross-sectional view schematically showing a structure of a light modulator according to another embodiment.

FIG. 7 is a lateral cross-sectional schematically showing a structure of a light modulator 1120 according to another embodiment. When describing the embodiment of FIG. 7, aspects that are the same as the aspects of the embodiment of FIG. 1 are omitted.

Referring to FIG. 7, the light modulator 1120 may include a first DBR layer 120 of a first reflectivity Rb, a second DBR layer 320 of a second reflectivity Rf, and an active layer 220 disposed between the first DBR layer 120 and the second DBR layer 320. The first DBR layer 120 may include two refractive index layers that have different refractive indices from each other and are repeatedly alternately stacked. The active layer 220 is provided on the first DBR layer 120 and may include a quantum well structure having a stack structure in which a well layer 222 and a first barrier layer 221 are alternately stacked, wherein at least one quantum dot 223 is provided in the well layer 222. The second DBR layer 320 may be provided on the active layer 220 and may include two refractive index layers that have different refractive indices from each other and are repeatedly alternately stacked. Also, the light modulator 1120 may further include a first contact layer 420 provided below the first DBR layer 120 and a second contact layer 520 provided above the second DBR layer 320. However, it is not limited thereto and the first contact layer 420 may be provided between the active layer 220 and the first DBR layer 120. Also, the second contact layer 520 may be provided between the active layer 220 and the second DBR layer 320.

The first DBR layer 120 and the second DBR layer 320 may have substantially the same structures as the first DBR layer 100 and the second DBR layer 300 of FIG. 1, respectively. For example, the first DBR layer 120 and the second DBR layer 320 may include structures in which a low refractive index layer 14 having a relatively low refractive index and a high refractive index layer 15 having a relatively high refractive index are alternately stacked.

The first contact layer 420 and the second contact layer 520 may have substantially the same structures as the first contact layer 400 and the second contact layer 500 of FIG. 2, respectively.

The active layer 220 may include a semiconductor material having a quantum well structure. For example, the active layer 220 may include a plurality of stack structures ST1 through ST6 in which the well layer 222 and the first barrier layer 221 are alternately stacked. FIG. 7 illustrates the six stack structures ST1 through ST6. However, it is not limited thereto and there may be more than six stack structures. As the number of the stack structures ST1 through ST6 is increased, a gain of the active layer 220 may be increased. Meanwhile, the active layer 220 may include a first multi-stack structure MS1 having a plurality of stack structures (e.g., first through third stack structures ST1 through ST3) and a second multi-stack structure MS2 having a plurality of stack structures (e.g., fourth through sixth stack structures ST4 through ST6). However, it is not limited thereto and each of the first and second multi-stack structures MS1 and MS2 may include more or less than three stack structures. Also, FIG. 7 illustrates two multi-stack structures. However, it is not limited thereto and the active layer 220 may include more than two multi-stack structures. Also, a second barrier layer 224 may further be provided between the first multi-stack structure MS1 and the second multi-stack structure MS2. Also, the second barrier layer 224 may be provided between the first multi-stack structure MS1 and the second DBR layer 320. In addition, the second barrier layer 224 may be provided between the second multi-stack structure MS2 and the first DBR layer 120. That is, the light modulator 1120 may have a plurality of the second barrier layers 224. A thickness of the second barrier layer 224 may be greater than a thickness of the first barrier layer 221. Also, the well layer 222 may include the at least one quantum dot 223. The quantum dot 223 may have substantially the same structure as the quantum dot 203 of FIG. 2.

Figure 8:
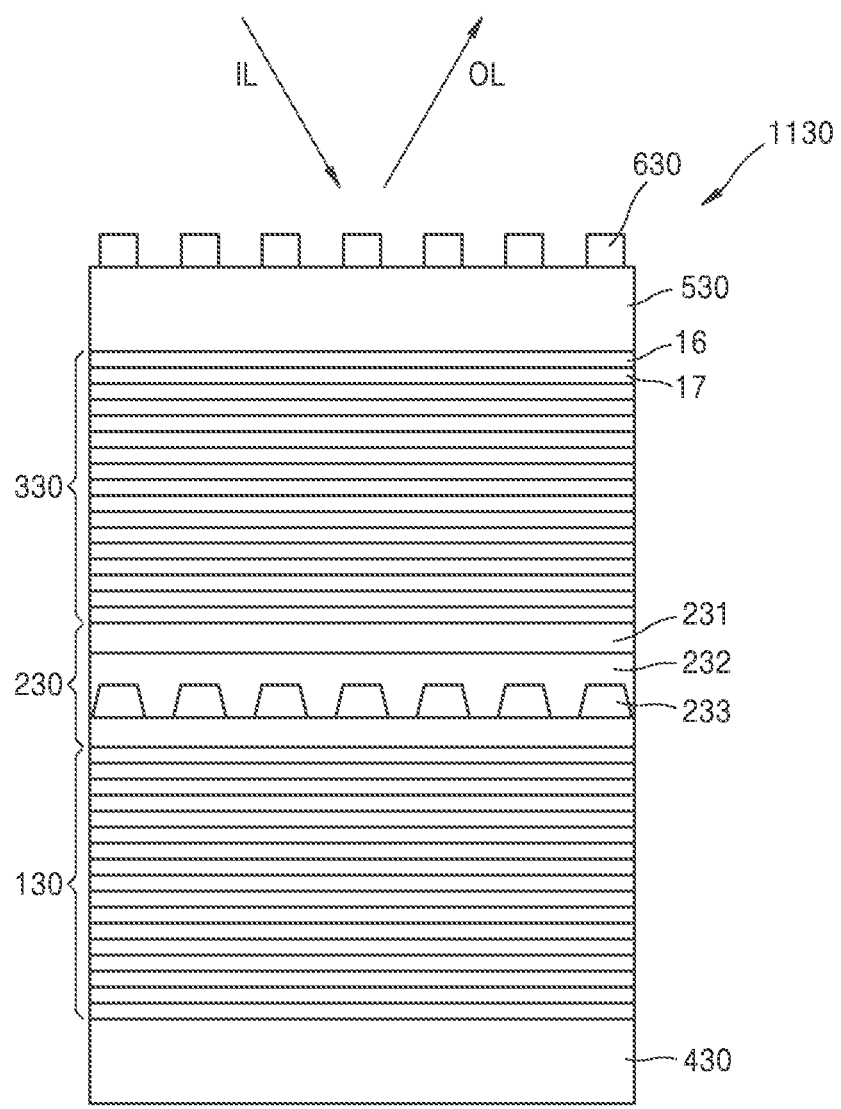
FIG. 8 is a lateral cross-sectional view schematically showing a structure of a light modulator according to another embodiment.

FIG. 8 is a lateral cross-sectional schematically showing a structure of a light modulator 1130 according to another embodiment. When describing the embodiment of FIG. 8, aspects that are the same as the aspects of the embodiment of FIG. 1 are omitted.

Referring to FIG. 8, the light modulator 1130 may include a first DBR layer 130 of a first reflectivity Rb, a second DBR layer 330 of a second reflectivity Rf, and an active layer 230 disposed between the first DBR layer 130 and the second DBR layer 330. The first DBR layer 130 may include two refractive index layers that have different refractive indices from each other and are repeatedly alternately stacked. The active layer 230 may be provided on the first DBR layer 130 and may include a quantum well structure having a stack structure in which a well layer 232 and a first barrier layer 231 are alternately stacked, wherein at least one quantum dot 233 is provided in the well layer 232. The second DBR layer 330 may be provided on the active layer 230 and may include two refractive index layers that have different refractive indices from each other and are repeatedly alternately stacked. Also, the light modulator 1130 may further include a first contact layer 430 provided below the first DBR layer 130 and a second contact layer 530 provided above the second DBR layer 330. However, it is not limited thereto and the first contact layer 430 may be provided between the active layer 230 and the first DBR layer 130. Also, the second contact layer 530 may be provided between the active layer 230 and the second DBR layer 330.

The first DBR layer 130 and the second DBR layer 330 may have substantially the same structures as the first DBR layer 100 and the second DBR layer 300 of FIG. 1, respectively. For example, the first DBR layer 130 and the second DBR layer 330 may include structures in which a low refractive index layer 16 having a relatively low refractive index and a high refractive index layer 17 having a relatively high refractive index are alternately stacked.

The first contact layer 430 and the second contact layer 530 may have substantially the same structures as the first contact layer 400 and the second contact layer 500 of FIG. 2, respectively.

The active layer 230 may have substantially the same structure as the active layer 200 of FIG. 1. For example, the active layer 230 may include a stack structure in which the well layer 232 and the first barrier layer 231 are alternately stacked. For example, the well layer 232 may be provided between a pair of the first barrier layers 231. Also, the well layer 232 may include the at least one quantum dot 233. The quantum dot 233 may have substantially the same structure as the quantum dot 203 of FIG. 1.

Also, a plurality of meta structures 630 may be provided above the second DBR layer 330. For example, the plurality of meta structures 630 may be formed to directly contact the second contact layer 530 provided above the second DBR layer 330. However, when the second contact layer 530 is provided between the second DBR layer 330 and the active layer 230, the plurality of meta structures 630 may be formed to directly contact the second DBR layer 330.

The plurality of meta structures 630 may have a shape measure less than a wavelength of the incident light IL. In this case, before the incident light IL having a phase and an intensity modulated by the active layer 230 is output, the incident light IL may be also modulated by passing through the meta structures 630. Like this, the phase or the intensity of the incident light IL may be secondarily modulated through the meta structures 630. A degree of the second modulation of the incident light IL through the meta structures 630 may be determined based on the shape measure of the meta structures 630.

The shape measure of the plurality of meta structures 630 may be less than the wavelength of the incident light IL. For example, a height, a breadth, a width, a pitch, etc. of the plurality of meta structures 630 may be less than the wavelength of the incident light IL. At least two of the plurality of meta structures 630 may have different refractive indices from each other. For example, at least two of the plurality of meta structures 630 may have different shape measures, such as different heights, breadths, widths, pitches, etc., from each other, and thus, may have different refractive indices from each other.

Figure 9:
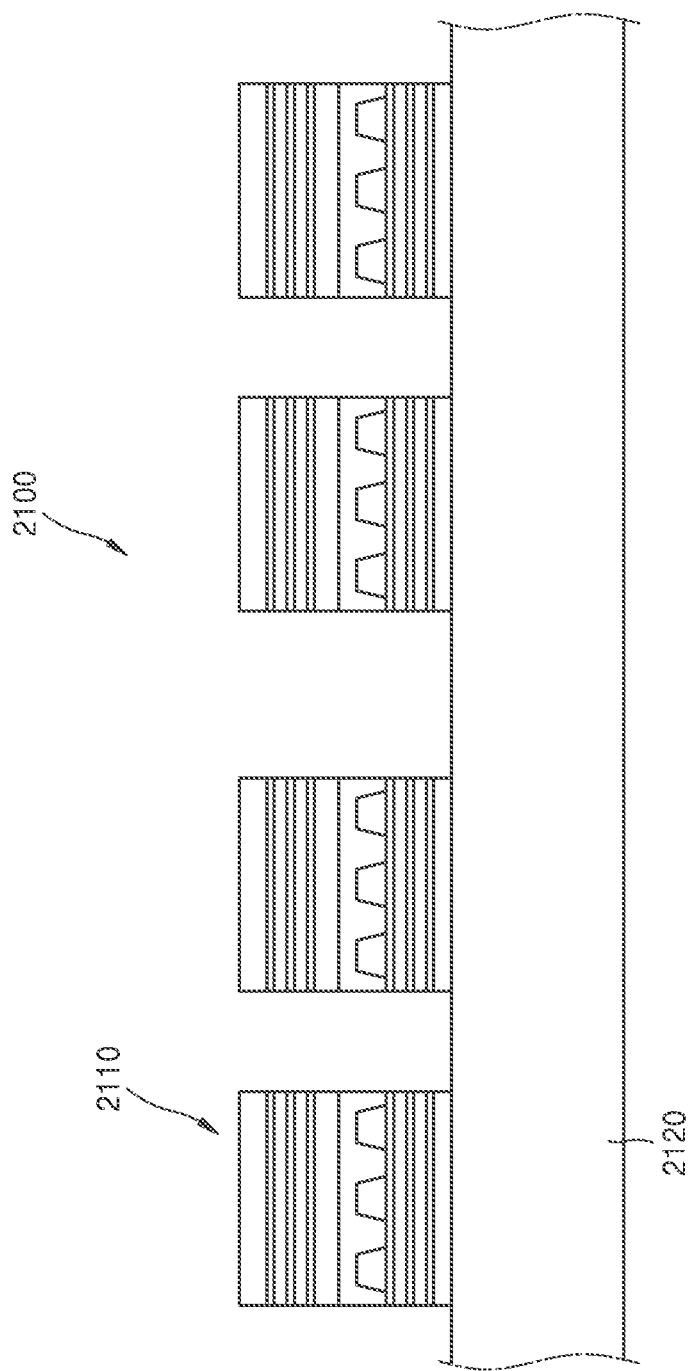
FIG. 9 is a lateral cross-sectional view schematically showing a structure of a light modulator array according to an embodiment.
Figure 10:
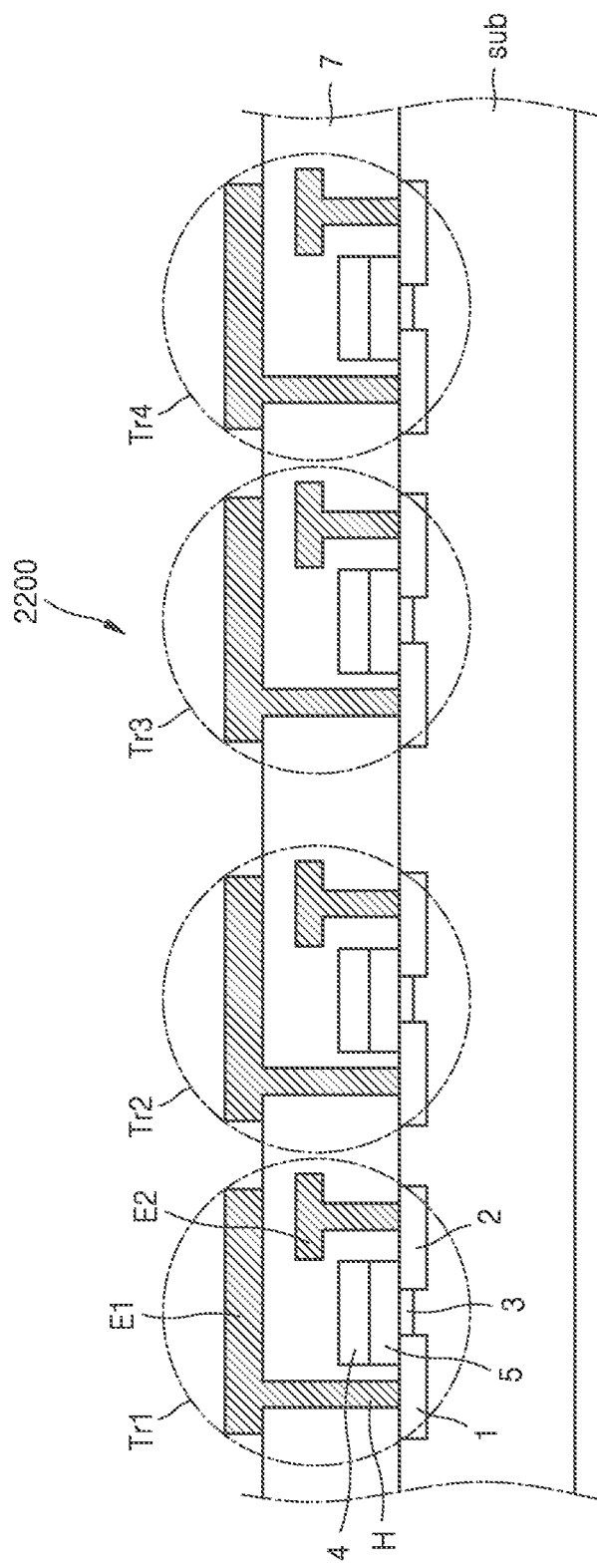
FIG. 10 is a lateral cross-sectional view schematically showing a structure of a control circuit for controlling the light modulator array of FIG. 9.
Figure 11:
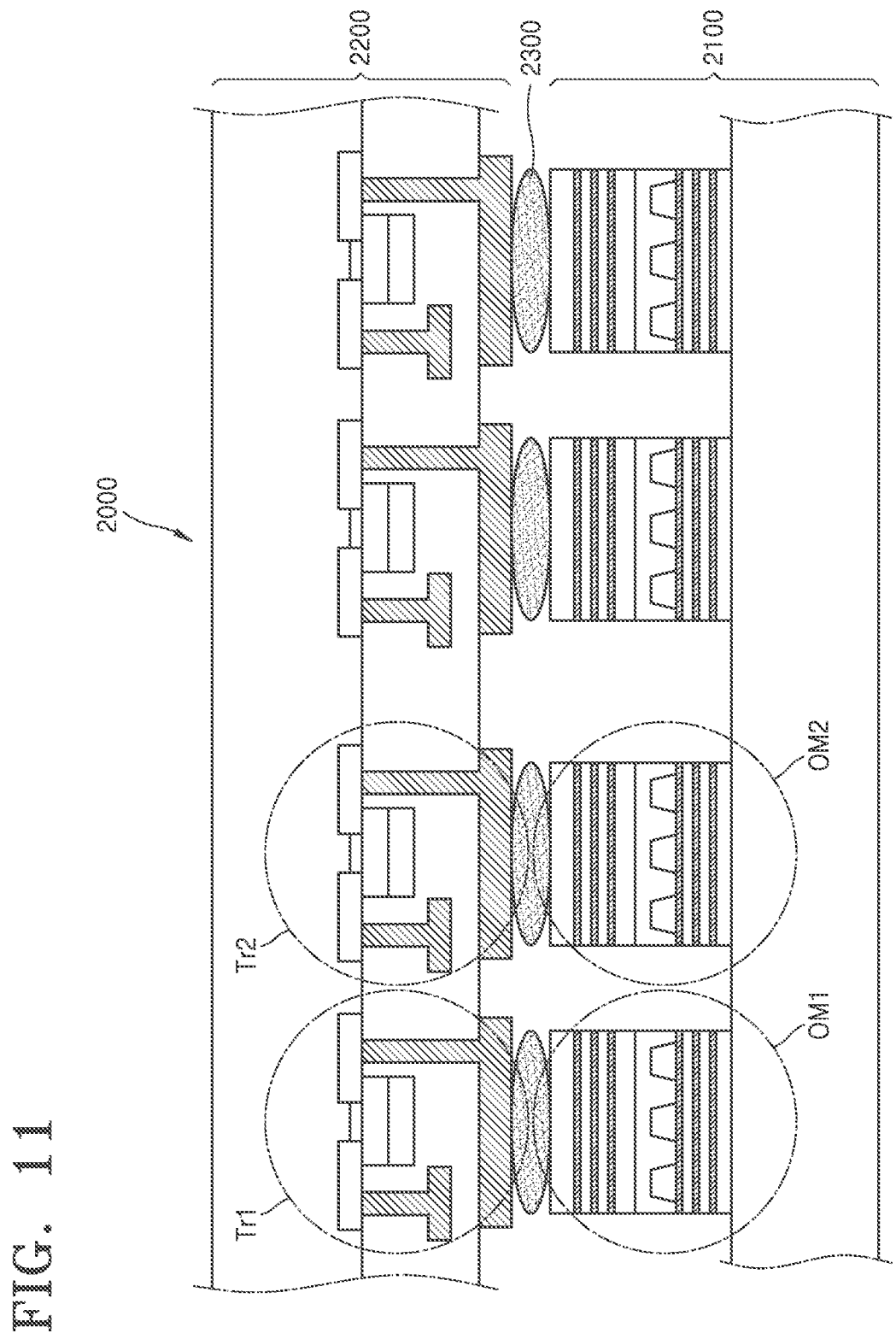
FIG. 11 is a lateral cross-sectional view schematically showing a beam steering device according to an embodiment.

FIG. 9 is a lateral cross-sectional view schematically showing a structure of a light modulator array 2100 according to an embodiment. FIG. 10 is a lateral cross-sectional view schematically showing a structure of a control circuit 2200 for controlling the light modulator array 2100 of FIG. 9. FIG. 11 is a lateral cross-sectional view schematically showing a beam steering device 2000 according to an embodiment.

Referring to FIG. 9, the light modulator array 2100 may include a plurality of light modulators 2110 arranged on a substrate 2120. For example, the plurality of light modulators 2110 may be substantially the same as the light modulators 1100, 1110, 1120, and 1130 of FIGS. 1, 6, 7, and 8. For example, each of the plurality of light modulators 2110 may include at least one quantum dot. Furthermore, a distribution density of the quantum dot of each of the plurality of light modulators 2110 may be the same. Accordingly, a gain of each of the plurality of light modulators 2110 may be the same. However, it is not limited thereto and the distribution density of the quantum dot of each of the plurality of light modulators 2110 may be different from each other, and thus, the gain of each of the plurality of light modulators 2110 may be different from each other.

Referring to FIG. 10, the control circuit 2200 may include a plurality of transistors Tr1 through Tr4. The first transistor Tr1 may be provided on a substrate sub and may include a source electrode 1 and a drain electrode 2 facing each other. The source electrode 1 and the drain electrode 2 may be doped with an n-type or a p-type material. A channel layer 3 may be formed between the source electrode 1 and the drain electrode 2. The channel layer 3 may be a region including an n-type material or a p-type material. For example, when both of the source electrode 1 and the drain electrode 2 are doped with an n-type material, the channel layer 3 may be a region including a p-type material. In this case, the first transistor Tr1 may be referred to as an n-channel metal oxide semiconductor (NMOS). Alternatively, when both of the source electrode 1 and the drain electrode 2 are doped with a p-type material, the channel layer 3 may be a region including an n-type material. In this case, the first transistor Tr1 may be referred to as a p-channel metal oxide semiconductor (PMOS). When the first transistor Tr1 is an NMOS, the second transistor Tr2 adjacent to the first transistor Tr1 may be a PMOS. In this case, the first transistor Tr1 and the second transistor Tr2 may be connected to each other to form a complementary metal oxide semiconductor (CMOS). For example, the drain electrodes 2 of the first transistor Tr1 and the second transistor Tr2 may be connected to each other to form a CMOS. Also, the first transistor Tr1 may further include a gate electrode 4 provided on a region on the substrate sub, the region corresponding to the channel layer 3. A gate insulating layer 5 may further be provided between the gate electrode 4 and the channel layer 3. An insulating layer 7 covering the gate electrode 4 may be provided on the substrate sub. A plurality of holes H may be formed in the insulating layer 7. A plurality of first electrodes E1 and a plurality of second electrodes E2 may be formed in the plurality of holes H. The plurality of first electrodes E1 may contact the plurality of source electrodes 1. Also, the plurality of first electrodes E1 may be formed to be exposed to the outside of the insulating layer 7. The plurality of second electrodes E2 may contact the plurality of drain electrodes 2. The plurality of drain electrodes 2 may be connected to each other in the insulating layer 7. FIG. 10 does not illustrate that the drain electrodes 2 are directly connected to each other, but the drain electrodes 2 may be connected to each other through a different route. The control circuit 2200 of FIG. 10 includes the four transistors Tr1 through Tr4. However, it is for convenience of explanation, and the control circuit 2200 may include more than four transistors.

Referring to FIG. 11, the beam steering device 2000 may include the light modulator array 2100 and the control circuit 2200. The light modulator array 2100 and the control circuit 2200 may be electrically connected to each other via bonding portions 2300. For example, the plurality of light modulators included in the light modulator array 2100 and the plurality of transistors included in the control circuit 2200 may be respectively electrically connected to each other. For example, the first transistor Tr1 electrically connected to a first light modulator OM1 may be an NMOS and the second transistor Tr2 electrically connected to a second light modulator OM2 adjacent to the first light modulator OM1 may be a PMOS. In this case, the first transistor Tr1 and the second transistor Tr2 may form a CMOS. In other words, the first light modulator OM1 and the second light modulator OM2 adjacent to each other may be electrically connected to a CMOS including the first transistor Tr1 and the second transistor Tr2. As described with reference to FIG. 10, the control circuit 2200 may include the plurality of transistors Tr1 through Tr4, and thus, the CMOS may be formed in a multiple number. Currents applied to the plurality of CMOSs included in the control circuit 2200 may be different from each other. Accordingly, different electrical signals may be transmitted to the light modulators electrically connected to the plurality of CMOSs. Accordingly, the control circuit 2200 including the plurality of CMOSs may separately control characteristics of the plurality of light modulators. For example, the control circuit 2200 may separately control refractive indices of the plurality of light modulators. In this case, each of the plurality of light modulators may have the same saturation gain. Accordingly, the intensity of the light output from each of the plurality of light modulators may be the same.

Figure 12:
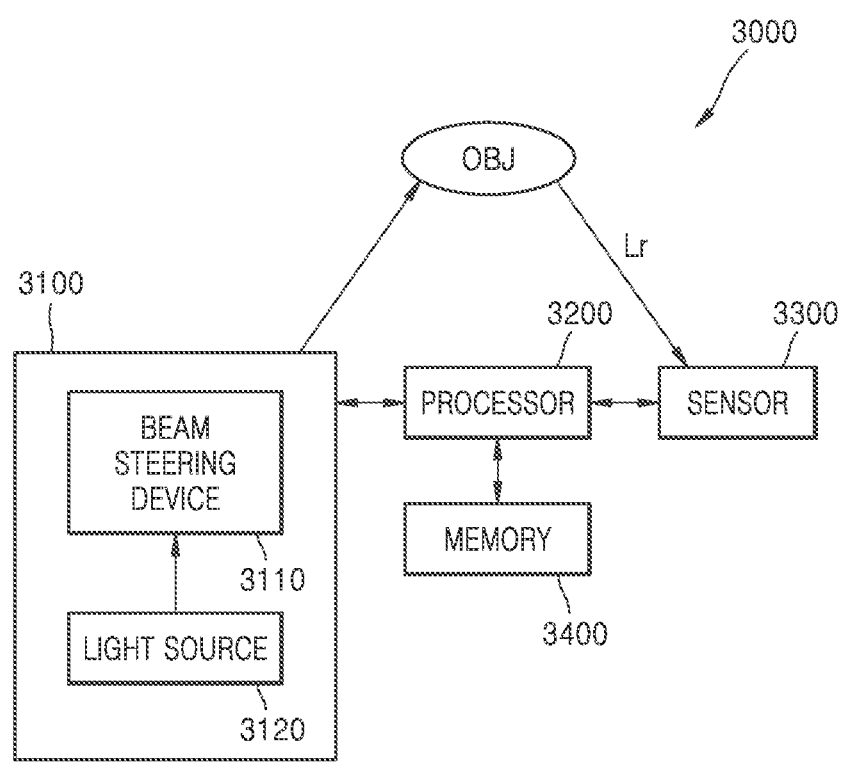
FIG. 12 is a block diagram showing a schematic structure of an electronic device according to an embodiment.

FIG. 12 is a block diagram showing a schematic structure of an electronic device 3000 according to an embodiment.

Referring to FIG. 12, the electronic device 3000 may include an illumination device 3100 configured to radiate light toward an object OBJ, a sensor 3300 configured to receive light reflected from the object OBJ, and a processor 3200 configured to perform calculation for obtaining information about the object OBJ from the light received from the sensor 3300. The electronic device 3000 may also include a memory 3400 in which a code or data for executing the processor 3200 is stored.

The illumination device 3100 may include a light source 3120 and a beam steering device 3110. The light source 3120 may generate a source light for scanning the object OBJ. The source light may be a pulse laser beam. The beam steering device 3110 may illuminate the object OBJ by changing a proceeding direction of light from the light source 3120 and may include the beam steering device 2000 of FIG. 11. It is described with reference to FIG. 11 that the light modulators 1100, 1110, 1120, and 1130 described with reference to FIGS. 1, 6, 7, and 8 may be applied in the beam steering device 2000.

Optical devices for modulating a direction of light from the illumination device 3100 such that the light is toward the object OBJ or optical devices for additional modulation may further be arranged between the illumination device 3100 and the object OBJ.

The sensor 3300 may sense the light $L_r$ reflected by the object OBJ. The sensor 3300 may include an array of light detecting elements. The sensor 3300 may further include a spectroscopic device for analyzing the light reflected from the object OBJ for each wavelength. In FIG. 12, the illumination device 3100 and the sensor 3300 may be integrated into a single sensing device, and in that case, the illumination device 3100 and the sensor 3300 may perform light emitting and light detecting operations, respectively.

The processor 3200 may perform calculation for obtaining information about the object OBJ from the light received from the sensor 3300. Also, the processor 3200 may generally process and control the electronic device 3000. The processor 3200 may obtain and process the information about the object OBJ. For example, the processor 3200 may obtain and process two-dimensional or three-dimensional image information. In addition, the processor 3200 may operate a light source included in the illumination device 3100 or generally control an operation of the sensor 3300. For example, the processor 3200 may calculate a value of a current applied to a light modulator included in the illumination device 3100. The processor 3200 may determine whether a user is authenticated or not, etc. based on the information obtained from the object OBJ, and may also execute other applications.

The memory 3400 may store codes for executions by the processor 3200. In addition, the memory 3400 may store various execution modules executed by the electronic device 3000, and data for the execution modules. For example, the memory 3400 may store a program code used by the processor 3200 to perform calculation for obtaining the information about the object OBJ, and a code, such as an application module, etc., executed by using the information about the object OBJ. Also, the memory 3400 may further store a communication module, a camera module, a video playing module, an audio playing module, etc. as a program for driving a device which may be additionally provided in the electronic device 3000.

After the calculation of the processor 3200, the information about a shape and a location of the object OBJ may be transmitted to other devices or units as required. For example, the information about the object OBJ may be transmitted to a controller of another electronic device using the information about the object OBJ. The other unit to which the information is transmitted may include a display device or a printer outputting a result. In addition, the other unit may include, but is not limited to, a smart phone, a cellular phone, a personal digital assistant (PDA), a laptop, a personal computer (PC), various wearable devices, and other mobile or non-mobile computing devices.

The memory 3400 may include a flash type memory, a hard disk type memory, a multi-media micro type memory, a card type memory (e.g., an SD or XD memory), random-access memory (RAM), static random-access memory (SRAM), read-only memory (ROM), electrically erasable programmable read-only memory (EEPROM), programmable read-only memory (PROM), a magnetic memory, a magnetic disk, an optical disk, etc.

The electronic device 3000 may include, for example, a portable mobile communication device, a smart phone, a smart watch, a PDA, a laptop, a PC, and other mobile or non-mobile computing devices, and is not limited thereto. Also, the electronic device 3000 may include autonomous driving machines, such as a self-driving vehicle, an autonomous vehicle, a robot, a drone, etc., or an Internet of things (IoT) device.

A phase and an intensity of light may be separately controlled by using a light modulator having a saturation gain, according to various embodiments of the disclosure.

A light proceeding direction may be efficiently modulated by using a beam steering device including the light modulator having the saturation gain, according to various embodiments of the disclosure.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A light modulator for amplifying an intensity of incident light and modulating a phase of the incident light, the light modulator comprising:
    a first distributed Bragg reflector (DBR) layer having a first reflectivity and comprising at least two first refractive index layers that have different refractive indices from each other and are repeatedly alternately stacked;
    a second DBR layer having a second reflectivity and comprising at least two second refractive index layers that have different refractive indices from each other and are repeatedly alternately stacked; and
    an active layer disposed between the first DBR layer and the second DBR layer, and comprising a quantum well structure, the quantum well structure having a stack structure including a well layer and a first barrier layer that are alternately stacked, wherein at least one quantum dot is provided in the well layer,
    wherein a band gap energy of the at least one quantum dot less than a band gap energy of the well layer.

2. The light modulator of claim 1, wherein the at least one quantum dot has a single gain satisfying Gs2*Rf*Rb<1, and
    wherein Gs, Rf, and Rb denote the single gain, the second reflectivity, and the first reflectivity.

3. The light modulator of claim 1, wherein the at least one quantum dot has a single gain satisfying Gs2>1/Rb, and
    wherein Gs, Rf, and Rb denote the single gain, the second reflectivity, and the first reflectivity.

4. The light modulator of claim 1, wherein
    the active layer comprises a plurality of stack structures, and each of the plurality of stack structures comprises the well layer and the first barrier layer that are alternately stacked.

5. The light modulator of claim 1, wherein the active layer comprises
    a first multi-stack structure having a first plurality of stack structures and
    a second multi-stack structure having a second plurality of stack structures.

6. The light modulator of claim 5, further comprising a second barrier layer between the first multi-stack structure and the second multi-stack structure.

7. The light modulator of claim 6,
    wherein a thickness of the second barrier layer is greater than a thickness of the first barrier layer.

8. The light modulator of claim 1, wherein the quantum well structure of the active layer comprise at least one quantum dot, and the band gap energy of the at least one quantum dot is equal to an energy of the incident light.

9. The light modulator of claim 1, wherein the active layer has a saturation gain at an applied current having a value greater than or equal to a predetermined value.

10. The light modulator of claim 1, wherein the first reflectivity is greater than the second reflectivity.

11. The light modulator of claim 1, further comprising a processor configured to separately modulate a refractive index and a gain of the active layer by applying a current between the first DBR layer and the second DBR layer.

12. The light modulator of claim 1, further comprising a plurality of meta structures disposed on the second DBR layer.

13. The light modulator of claim 12, wherein at least two of the plurality of meta structures have different refractive indices from each other.

14. The light modulator of claim 1, further comprising a first contact layer disposed on the first DBR layer and a second contact layer disposed on the second DBR layer.

15. A beam steering device comprising:
a light modulator array comprising a plurality of light modulators comprising the light modulator of claim 1, the plurality of light modulators having a same structure; and
a control circuit configured to separately control refractive indices of the plurality of light modulators.

16. The beam steering device of claim 15, wherein the plurality of light modulators have a same quantum dot distribution density.

17. The beam steering device of claim 15, wherein the control circuit comprises a plurality of complementary metal-oxide-semiconductor (CMOS) devices each being connected to two adjacent light modulators of the plurality of light modulators.

18. An electronic device comprising:
a light source;
the beam steering device of claim 15, which is configured to modulate a proceeding direction of the light incident from the light source toward an object;
a sensor configured to receive the light that is reflected from the object; and
a processor configured to analyze the light received by the sensor.

19. The electronic device of claim 18, wherein the at least one quantum dot has a single gain satisfying $1/Rb < Gs2 < 1/(RP*Rb)$, and
wherein Gs, Rb, and Rf denote the single gain, the first reflectivity, and the second reflectivity.

* * * * *